(12) United States Patent
Chen

(10) Patent No.: US 10,701,978 B2
(45) Date of Patent: Jul. 7, 2020

(54) ATOMIZER AND ELECTRONIC CIGARETTE HAVING SAME

(71) Applicant: SHENZHEN IVPS TECHNOLOGY CO., LTD., Shenzhen, Guangdong Province (CN)

(72) Inventor: Wen Chen, Shenzhen (CN)

(73) Assignee: SHENZHEN IVPS TECHNOLOGY CO., LTD., Shenzhen, Guangdong (CN)

( * ) Notice: Subject to any disclaimer, the term of this patent is extended or adjusted under 35 U.S.C. 154(b) by 308 days.

(21) Appl. No.: 15/910,336

(22) Filed: Mar. 2, 2018

(65) Prior Publication Data

US 2018/0325177 A1 Nov. 15, 2018

(30) Foreign Application Priority Data

Jan. 4, 2017 (CN) .................... 2017 2 0012266 U

(51) Int. Cl.
  *A24F 13/00* (2006.01)
  *A24F 47/00* (2020.01)
  *F16J 15/32* (2016.01)
(52) U.S. Cl.
  CPC ............ *A24F 47/008* (2013.01); *F16J 15/32* (2013.01)

(58) Field of Classification Search
  CPC ...................................... A24F 47/00
  USPC .................................. 131/328–329
  See application file for complete search history.

(56) References Cited

U.S. PATENT DOCUMENTS

2020/0029624 A1\* 1/2020 Liu .................... H01M 2/1066

\* cited by examiner

*Primary Examiner* — Phuong K Dinh
(74) *Attorney, Agent, or Firm* — IP-PAL Patent US; Klaus Michael Schmid

(57) ABSTRACT

The present disclosure provides an atomizer and an electronic cigarette using same. The atomizer comprises a core assembly. The core assembly comprises an airflow shell, an atomizing seat partially accommodated in the airflow shell, and an oil-guiding seat connected with a part of the atomizing seat uncovered by the airflow shell. At least one air-inlet passage is formed between an inner wall of the airflow shell and an outer wall of the he atomizing seat. An atomizing chamber is defined inside the atomizing seat, and an oil-guiding chamber is defined inside the atomizing seat. The air-inlet passage and the oil-guiding chamber both communicate with the atomizing chamber. The atomizer of the present disclosure adopts a top air-inlet structure in order to solve the question of bottom oil leakage in the traditional electronic cigarette and has a better atomizing performance.

10 Claims, 2 Drawing Sheets

ATOMIZER AND ELECTRONIC CIGARETTE HAVING SAME

CROSS REFERENCE TO RELATED APPLICATIONS

The present application claims priority to Chinese Patent Application CN 201720012266.7 filed on Jan. 4, 2017.

TECHNICAL FIELD

The present disclosure relates to technical field of electronic cigarette, especially to an atomizer and an electronic cigarette using the same.

BACKGROUND

An electronic cigarette is a smoke-producing product using an atomizer to heat oil and could be used as an alternative to traditional cigarette. Because of using convenience and changeable flavor taste of oil, and also because of harmless to human body, electronic cigarettes are widely loved by people in domestic and foreign markets.

At present, all atomizers of electronic cigarette in the prior art adopt bottom air-inlet structures. But the bottom air-inlet structure could cause oil leakage of atomizer easily.

SUMMARY

The aims of the present disclosure is to provide an atomizer which can solve the oil leakage problem and has a better atomizing performance.

To realize the above aims, the present disclosure provides an atomizer comprising a core assembly. The core assembly comprises an airflow shell, an atomizing seat partially accommodated in the airflow shell, and an oil-guiding seat connected with a part of the atomizing seat uncovered by the airflow shell. At least one air-inlet passage is formed between an inner wall of the airflow shell and an outer wall of the atomizing seat. An atomizing chamber is defined inside the atomizing seat, and an oil-guiding chamber is defined inside the oil-guiding seat. The air-inlet passage and the oil-guiding chamber both communicate with the atomizing chamber.

Preferably, the core assembly further comprises an atomizing cover at least partially accommodated in the airflow shell. The atomizing cover sleeves an end of the atomizing seat far away from the oil-guiding seat (13).

Preferably, the atomizer further comprises an upper-cover assembly, a lower-cover assembly and a sleeve assembly sleeving the core assembly. The upper-cover assembly is connected to one end of the core assembly and the sleeve assembly, and the lower-cover assembly is connected to the other end of the core assembly and the sleeve assembly. The core assembly, the upper-cover assembly, the lower-cover assembly and the sleeve assembly together form an oil-storing chamber. The oil-storing chamber is in communication with the oil-guiding chamber. The oil-storing chamber communicates with the atomizing chamber through the oil-guiding chamber.

Preferably, the upper-cover assembly comprises an air-guiding seat (21) and an adjusting element sleeving the air-guiding seat. The air-guiding seat sleeves an end of the airflow shell far away from the oil-guiding seat. The air-guiding seat defines at least one air-inlet opening and one smoke-outlet opening. The air-inlet opening communicates with the air-inlet passage, and the adjusting element covers or uncovers the air-inlet opening. The smoke-outlet opening communicates with the atomizing chamber.

Preferably, the upper-cover assembly further comprises a dripping nozzle connector and a dripping nozzle. A protruding stage protrudes from an outer wall of the dripping nozzle connector, and the protruding stage abuts against the adjusting element. One end of the dripping nozzle connector is accommodated in the air-guiding seat, and the other end of the dripping nozzle connector is accommodated in the dripping nozzle. The dripping nozzle connector defines a smoke-guiding opening, and the dripping nozzle defines a smoking opening. The smoking opening communicates with the atomizing chamber through the smoke-guiding opening and the smoke-outlet opening in sequence.

Preferably, the sleeve assembly comprises a sleeve-connector, a sleeve and a decorating element sleeving sleeve-connector and the sleeve. The sleeve connects with the upper-cover assembly through the sleeve-connector.

Preferably, the atomizer further comprises at least one oil-absorbing element and a heating wire accommodated in the atomizing chamber. An accommodating chamber is defined inside the heating wire. One end of the oil-absorbing element is accommodated in the accommodating chamber, and the other end of the oil-absorbing element is accommodated in the oil-guiding chamber.

Preferably, the lower-cover assembly comprises a base seat and a contacting assembly extending through the base seat. The contacting assembly is partially accommodated in the base seat.

Preferably, the contacting assembly comprises a connector, a contacting element extending through the base seat and a first insulator and a second insulator sleeving the contactor. The connector is concavely set with a groove, and an end of the contacting element close to the core assembly is embedded in the groove. A surface of an opening periphery of the groove abuts against an end-surface of the first insulator close to the connector, and the second insulator is partially accommodated in the first insulator.

the present disclosure further provides an electronic cigarette, and the electronic cigarette comprises above mentioned atomizer. The electronic cigarette further comprises a battery structure, and the atomizer is connected to the battery structure.

In the technical solution of the present disclosure, the core assembly comprises an airflow shell, an atomizing seat partially accommodated in the airflow shell, and an oil-guiding seat connected with a part of the atomizing seat uncovered by the airflow shell. At least one air-inlet passage is formed between an inner wall of the airflow shell and an outer wall of the atomizing seat, and a quantity of air is reserved in the air-inlet passage so as to ensure a normal volatilization of oil and a better atomizing performance. An atomizing chamber is defined inside the atomizing seat, and oil is atomized in the atomizing chamber in order to produce smoke. An oil-guiding chamber communicated with the atomizing chamber is defined inside the oil-guiding seat, and the oil-guiding chamber guides oil into the atomizing chamber in order to provide oil needed in atomizing. The atomizer of the present disclosure adopts a top air-inlet structure in order to solve the question of bottom oil leakage in the traditional electronic cigarette and has a better atomizing performance.

BRIEF DESCRIPTION OF THE DRAWINGS

For a better understanding of the embodiments of the present disclosure or the technical scheme in the prior art, accompanying drawings needed in the description of the embodiments or the prior art are simply illustrated below. Obviously, the accompanying drawings described below are some embodiments of the present disclosure. For the ordinary skill in the field, other accompanying drawings may be obtained according to the structure shown in these accompanying drawings without creative work.

DESCRIPTION OF THE REFERENCE NUMBER

Figure 1:
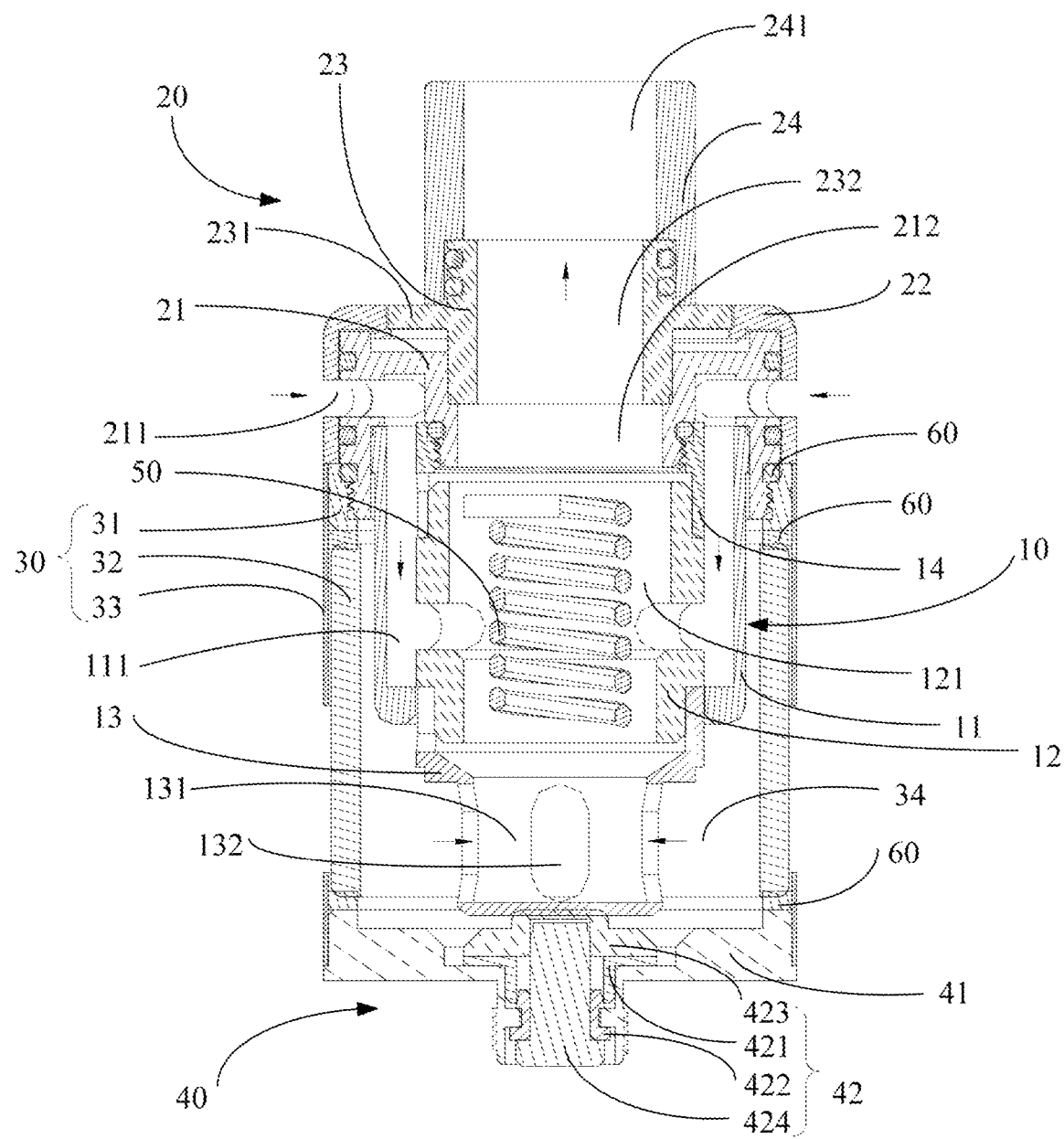
FIG. 1 is a sectional view of the embodiment of the atomizer in the present disclosure.

| Reference number | Part |
| --- | --- |
| 10 | core assembly |
| 11 | airflow shell |
| 111 | air-inlet passage |
| 12 | atomizing seat |
| 121 | atomizing chamber |
| 13 | oil-guiding seat |
| 131 | oil-guiding chamber |
| 132 | oil-guiding hole |
| 14 | atomizing cover |
| 20 | upper-cover assembly |
| 21 | air-guiding seat |
| 211 | air-inlet opening |
| 212 | smoke-outlet opening |
| 22 | adjusting element |
| 23 | dripping nozzle connector |
| 231 | protruding stage |
| 232 | smoke-guiding opening |
| 24 | dripping nozzle |
| 241 | smoking opening |
| 30 | sleeve assembly |
| 31 | sleeve-connector |
| 32 | sleeve-connector sleeve |
| 33 | decorating element |
| 34 | oil-storing chamber |
| 40 | lower-cover assembly |
| 41 | base seat |
| 42 | contacting assembly |
| 421 | first insulator |
| 422 | second insulator |
| 423 | connector |
| 424 | contacting element |
| 50 | heating wire |
| 60 | sealing element |

The implementation of aims, the function features and the advantages of the present disclosure are described below in further detail in conjunction with embodiments with reference to the drawings.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In addition, if terms "first", "second", etc. appear in the present disclosure, they are merely for the purpose of description, but cannot be understood as the indication or implication of relative importance or as the implicit indication of the number of the designated technical features; therefore, features defined by "first" and "second" may specifically or implicitly include at least one such feature. In addition, technical schemes of each embodiment of the present disclosure may be combined mutually; however, this must be carried out on the basis that the ordinary skill in this field can implement the combination. When the combination of technical schemes has a conflict or cannot be implemented, it should be considered that such combination of technical schemes does not exist and is not in the scope of protection claimed by the present disclosure.

In the present disclosure, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present disclosure according to specific conditions.

Figure 2:
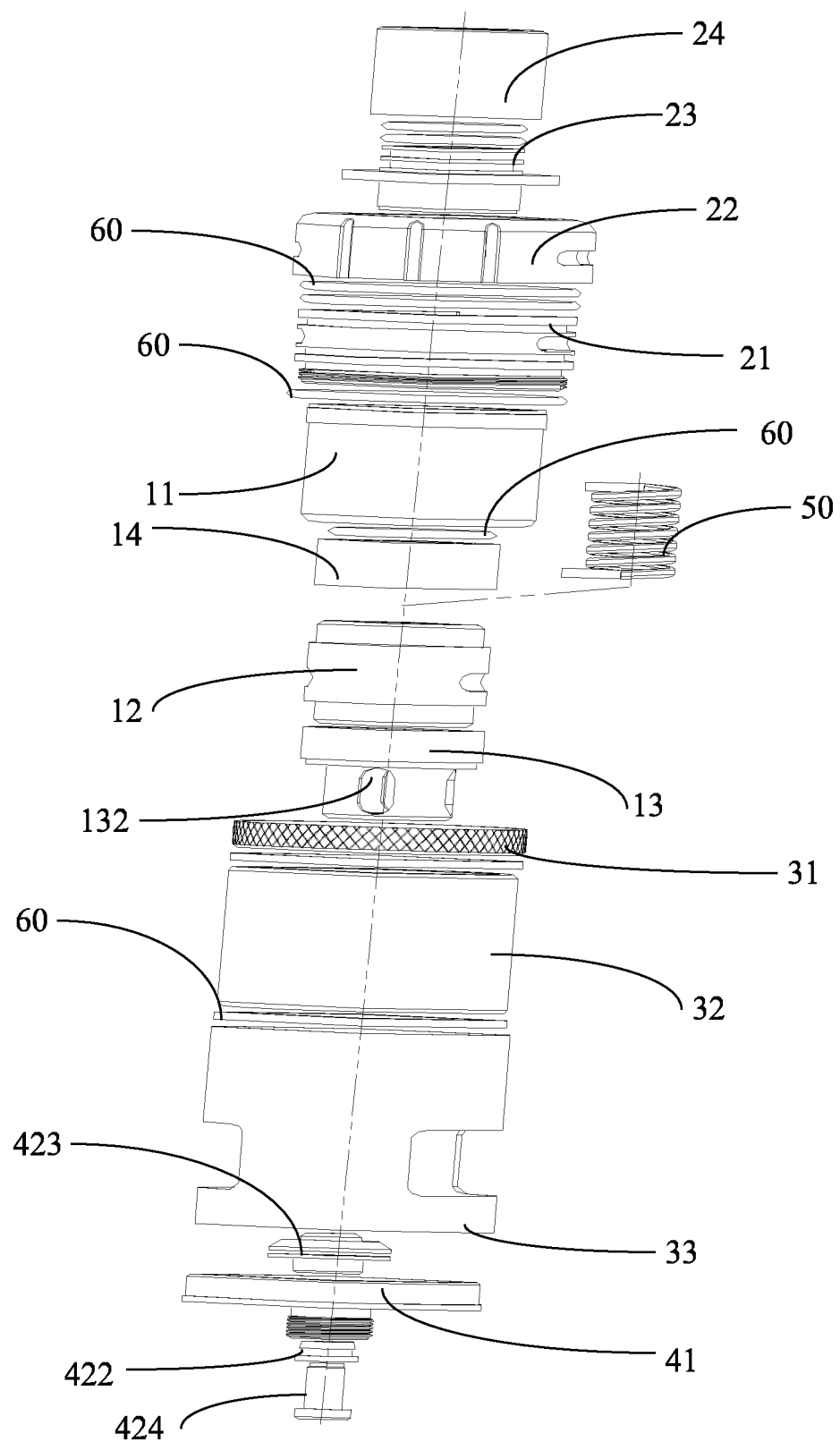
FIG. 2 is an exploded view of the embodiment of the atomizer in the present disclosure.

Referring to FIG. 1 and FIG. 2, the present disclosure provides an atomizer. The atomizer comprises a core assembly 10. The core assembly 10 comprises an airflow shell 11, an atomizing seat 12 partially accommodated in the airflow shell 11, and an oil-guiding seat 13 connected with a part of the atomizing seat 12 uncovered by the airflow shell 11. At least one air-inlet passage 111 is formed between an inner wall of airflow shell 11 and an outer wall of atomizing seat 12. An atomizing chamber 121 is defined inside the atomizing seat 12, and an oil-guiding chamber 131 is defined inside the oil-guiding seat 13. The air-inlet passage 111 and the oil-guiding chamber 131 both communicate with the atomizing chamber 121 communicate.

In the technical solution of the present disclosure, the core assembly 10 comprises an airflow shell 11, an atomizing seat 12 partially accommodated in airflow shell 11, and an oil-guiding seat 13 connected with a part of the atomizing seat 12 uncovered by the airflow shell 11. At least one air-inlet passage 111 communicated with atomizing chamber 121 is formed between the inner wall of the airflow shell 11 and the outer wall of the atomizing seat 12. A quantity of air is reserved in the air-inlet passage 111 so as to ensure a normal volatilization of oil and a better atomizing performance. An atomizing chamber 121 is defined inside the atomizing seat 12, and oil is atomized in the atomizing chamber 121 in order to produce smoke. An oil-guiding chamber 131 communicated with the atomizing chamber 121 is defined inside the oil-guiding seat 13, and oil-guidance chamber 131 guides oil into the atomizing chamber 121 so as to provide oil needed in atomizing. The atomizer of the present disclosure adopts a top air-inlet structure in order to solve the question of bottom oil leakage in the traditional electronic cigarette and has a better atomizing performance.

Referring to FIG. 1 and FIG. 2, the core assembly 10 further comprises an atomizing cover 14 at least partially accommodated in the airflow shell 11. The atomizing cover 14 sleeves on an end of the atomizing seat 12 far away from the oil-guiding seat 13.

Furthermore, the end of the atomizing cover 14 sleeved on the end of the atomizing seat 12 is set with a threaded hole (not shown), and the threaded hole communicates with the atomizing chamber 121.

In the technical solution of the present disclosure, the atomizing cover 14 sleeves on the end of the atomizing seat 12 far away from the oil-guiding seat 13 so as to sealing connect the atomizing cover 14 with the upper-cover assembly 20.

Referring to FIG. 1 and FIG. 2, the atomizer further comprises an upper-cover assembly 20, a lower-cover assembly 40 and a sleeve assembly 30 sleeving core assembly 10. The upper-cover assembly 20 is connected to one end of the core assembly 10 and the sleeve assembly 30. The lower-cover assembly 40 is connected to the other end of the core assembly 10 and the sleeve assembly 30. The core assembly 10, the upper-cover assembly 20, the lower-cover assembly 40 and the sleeve assembly 30 together form an oil-storing chamber 34. The oil-storing chamber 34 is in communication with the oil-guiding chamber 131. The oil-storing chamber 34 communicates with the atomizing chamber 121 through oil-guiding chamber 131.

Specifically, the oil-guiding seat 13 is set with at least one oil-guiding hole 132, and the oil-storing chamber 34 communicates with the oil-guiding chamber 131 through the oil-guiding hole 132.

In the technical solution of the present disclosure, the core assembly 10, the upper-cover assembly 20, the lower-cover assembly 40 and the sleeve assembly 30 together form an oil-storing chamber 34. The oil-storing chamber 34 communicates with the oil-guiding chamber 131. The oil-storing chamber 34 communicates with the atomizing chamber 121 through the oil-guiding chamber 131. After the atomizer is assembled, oil is refilled in the oil-storing chamber 34. The oil storing in the oil-storing chamber 34 runs into the oil-guiding chamber 131 through the oil-guiding hole 132 and further enters into the atomizing chamber 121 so as to provide oil needed in atomizing.

Referring to FIG. 1 and FIG. 2, the upper-cover assembly 20 comprises an air-guiding seat 21 and an adjusting element 22 sleeving the air-guiding seat 21. The air-guiding seat 21 sleeves an end of the airflow shell 11 far away from the oil-guiding seat 13. The air-guiding seat 21 defines at least one air-inlet opening 211 and one smoke-outlet opening 212. The air-inlet opening 211 communicates with the air-inlet passage 111, and the adjusting element 22 covers or uncovers the air-inlet opening 211. The smoke-outlet opening 212 communicates with the atomizing chamber 121.

Furthermore, the adjusting element 22 is rotatably set on the air-guiding seat 21.

In the technical solution of the present disclosure, the air-guiding seat 21 defines at least one air-inlet opening 211. The air-inlet opening 211 communicates with the air-inlet passage 111 so that the outer air is guided in through the air-inlet opening 211 and enters into the atomizing chamber 121 through the air-inlet passage 111, thus providing air for atomizing oil. The smoke-outlet opening 212 defined in the air-guiding seat 21 guides the smoke produced in the atomizing chamber 121 out so as to be taken in by users. The adjusting element 22 sleeves the air-guiding seat 21. By rotating the adjusting element 22, the air-inlet opening 211 is covered and the uncovered opening size of the air-inlet opening 211 is adjusted, thus adjusting the quantity of the airflow of the atomizer. Users could adjust the smoke concentration and smoke quantity according to personal needs.

Referring to FIG. 1 and FIG. 2, the upper-cover assembly 20 further comprises a dripping nozzle connector 23 and a dripping nozzle 24. A protruding stage 231 protrudes from the outer wall of the dripping nozzle connector 23. The protruding stage 231 abuts against the adjusting element 22. One end of the dripping nozzle connector 23 is accommodated in the air-guiding seat 21, and the other end of the dripping nozzle connector 23 is accommodated in the dripping nozzle 24. The dripping nozzle connector 23 defines a smoke-guiding opening 232, and the dripping nozzle 24 defines a smoking opening 241. The smoking opening 241 communicates with the atomizing chamber 121 through the smoke-guiding opening 232 and the smoke-outlet opening 212 in sequence.

In the technical solution of the present disclosure, one end of the dripping nozzle connector 23 is accommodated in the air-guiding seat 21, and the other end of the dripping nozzle connector 23 is accommodated in dripping nozzle 24. Preferably, one end of the dripping nozzle connector 23 is sealing connected with the air-guiding seat 21, and the other end of the dripping nozzle connector 23 is sealing connected with the dripping nozzle 24. The dripping nozzle connector 23 is used for setting the dripping nozzle 24 on the air-guiding seat 21. The dripping nozzle connector 23 is set with a smoke-guiding opening 232, and the dripping nozzle 24 is set with a smoking opening 241. The smoking opening 241 communicates with the atomizing chamber 121 through the smoke-guiding opening 232 and the smoke-outlet opening 212 in sequence. When users smoke, smoke ejected from the smoke-outlet opening 212 runs into mouths of users through smoke-guiding opening 232 and smoking opening 241 in sequence.

Referring to FIG. 1 and FIG. 2, the sleeve assembly 30 comprises a sleeve-connector 31, a sleeve 32, and a decorating element 33 sleeving the sleeve-connector 31 and the sleeve 32. The sleeve 32 connects with the upper-cover assembly 20 through the sleeve-connector 31.

Furthermore, the sleeve-connector 31 and the air-guiding seat 21 are threaded connection. A sealing element 60 is set between the sleeve-connector 31 and the air-guiding seat 21. A sealing element 60 is also set between the sleeve-connector 31 and the sleeve 32. The sealing element 60 has a better sealing function in order to prevent oil leakage. Preferably, the sealing element 60 is a silicon ring.

In the technical solution of the present disclosure, the sleeve-connector 31 is used for tightly connecting the sleeve 32 with the upper-cover assembly 20. The decorating element 33 sleeves the sleeve-connector 31 and the sleeve 32 so as to improve the appearance beauty of atomizer. Preferably, the sleeve 32 is a transparent structure so that users could monitor the oil quantity in the oil-storing chamber 34 at any time and refill oil in time and it has a beauty appearance at the same time. The sleeve 32 could be made of glasses or transparent plastic materials. It should be understood that, the material of the sleeve 32 is not limited in the embodiment of the present disclosure.

Referring to FIG. 1 and FIG. 2, the atomizer further comprises at least one oil-absorbing element (not shown) and a heating wire 50 accommodated in atomizing chamber 121. An accommodating chamber (not numbered) is defined in the heating wire 50. One end of the oil-absorbing element is accommodated in the accommodating chamber and the other end of the oil-absorbing element is accommodated in oil-guiding chamber 131.

Preferably, the oil-absorbing element is made of oil-absorbing cotton and so on. One end of the oil-absorbing element is accommodated in the accommodating chamber. The other end of the oil-absorbing element is accommodated in oil-guiding hole 132 in order to guide the oil storing in the oil-storing chamber 34 into the accommodating chamber through the oil-guiding hole 132 and the oil-guiding chamber 131 in sequence, thus providing oil needed in atomizing for heating wire 50. The way of oil-absorbing cotton could avoid an over quantity of oil on the heating wire 50 that will affect the smoke feel. At the same time, the oil-absorbing cotton has the benefit of environmental protection.

Referring to FIG. 1 and FIG. 2, the lower-cover assembly 40 comprises a base seat 41 and a contacting assembly 42 extending through the base seat 41. The contacting assembly 42 is partially accommodated in the base seat 41.

In the technical solution of the present disclosure, the base seat 41 is connected with the sleeve assembly 30 and the core assembly 10. Specifically, base seat 41 is sealing connected with the sleeve 32. A sealing element 60 is set between the base seat 41 and the sleeve 32. The contacting assembly 42 extends through the base seat 41 and the contacting assembly 42 electrical connects with the heating wire 50. The contacting assembly 42 is used for electrical connecting the heating wire 50 with the battery structure of the electronic cigarette.

Referring to FIG. 1 and FIG. 2, the contacting assembly 42 comprises a connector 423, a contacting element 424 extending through base seat 41, and a first insulator 421 and a second insulator 422 sleeving contacting element 424. The connector 423 is concavely set with a groove. An end of the contacting element 424 close to the core assembly 10 is embedded in the groove. A surface of an opening periphery of the groove abuts against an end-surface of the first insulator 421 close to the connector 423, and the second insulator 422 is partially accommodated in the second insulator 421.

In the technical solution of the present disclosure, the contacting element 424 extends through the base seat 41, and the contacting element 424 electrical connects with the heating wire 50. The contacting element 424 is used for electrical connecting the heating wire 50 with the battery structure of the electronic cigarette. The first insulator 421 and the second insulator 422 are used for insulating the periphery of the contacting element 424 in order to realize anti-creeping.

The present disclosure further provides an electronic cigarette. The electronic cigarette comprises above mentioned atomizer. The specified structure of the atomizer is referred in the above embodiments. For the electronic cigarette adopting the technical solutions of all above embodiments, the electronic cigarette has all benefits of the technical solutions of the above embodiments and those benefits will not be described again. Wherein the electronic cigarette further comprises a battery structure (not illustrated), and the atomizer is connected to the battery structure.

Specifically, the heating wire 50 is electrical connected with the battery structure, and the battery structure provides power for the heating wire 50.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

What is to be claimed is:

1. An atomizer, wherein the atomizer comprises a core assembly, the core assembly comprises an airflow shell, an atomizing seat partially accommodated in the airflow shell, and an oil-guiding seat connected with a part of the atomizing seat uncovered by the airflow shell, at least one air-inlet passage is formed between an inner wall of the airflow shell and an outer wall of the atomizing seat, an atomizing chamber is defined inside the atomizing seat, an oil-guiding chamber is defined inside the oil-guiding seat, the air-inlet passage and the oil-guiding chamber both communicate with the atomizing chamber.

2. The atomizer according to claim 1, wherein the core assembly further comprises an atomizing cover at least partially accommodated in the airflow shell, and the atomizing cover sleeves an end of the atomizing seat far away from the oil-guiding seat.

3. The atomizer according to claim 1, wherein the atomizer further comprises an upper-cover assembly, a lower-cover assembly and a sleeve assembly sleeving the core assembly, the upper-cover assembly is connected to one end of the core assembly and the sleeve assembly, the lower-cover assembly is connected to the other end of the core assembly and the sleeve assembly, the core assembly, the upper-cover assembly, the lower-cover assembly and the sleeve assembly together form an oil-storing chamber, the oil-storing chamber is in communication with the oil-guiding chamber, the oil-storing chamber communicates with the atomizing chamber through the oil-guiding chamber.

4. The atomizer according to claim 3, wherein the upper-cover assembly comprises an air-guiding seat and an adjusting element sleeving the air-guiding seat, the air-guiding seat sleeves an end of the airflow shell far away from the oil-guiding seat, the air-guiding seat defines at least one air-inlet opening and one smoke-outlet opening, the air-inlet opening communicates with the air-inlet passage, the adjusting element covers or uncovers the air-inlet opening, the smoke-outlet opening communicates with the atomizing chamber.

5. The atomizer according to claim 4, wherein the upper-cover assembly further comprises a dripping nozzle connector and a dripping nozzle, a protruding stage protrudes from an outer wall of the dripping nozzle connector, the protruding stage abuts against the adjusting element, one end of the dripping nozzle connector is accommodated in the air-guiding seat, the other end of the dripping nozzle connector is accommodated in the dripping nozzle, the dripping nozzle connector defines a smoke-guiding opening, the dripping nozzle defines a smoking opening, the smoking opening communicates with the atomizing chamber through the smoke-guiding opening and the smoke-outlet opening in sequence.

6. The atomizer according to claim 3, wherein the sleeve assembly comprises a sleeve-connector, a sleeve and a decorating element sleeving the sleeve-connector and the sleeve, the sleeve connects with the upper-cover assembly through the sleeve-connector.

7. The atomizer according to claim 1, wherein the atomizer further comprises at least one oil-absorbing element and a heating wire accommodated in the atomizing chamber, an accommodating chamber is defined inside the heating wire, one end of the oil-absorbing element is accommodated in the accommodating chamber, the other end of the oil-absorbing element is accommodated in the oil-guiding chamber.

8. The atomizer according to claim 3, wherein the lower-cover assembly comprises a base seat and a contacting assembly extending through the base seat, the contacting assembly is partially accommodated in the base seat.

9. The atomizer according to claim 8, wherein the contacting assembly comprises a connector, a contacting element extending through the base seat, and a first insulator and a second insulator sleeving the contacting element, the connector is concavely set with a groove, an end of the contacting element close to the core assembly is embedded in the groove, a surface of an opening periphery of the groove abuts against an end-surface of the first insulator close to the connector, the second insulator is partially accommodated in the first insulator.

10. An electronic cigarette, wherein the electronic cigarette comprises the atomizer according to claim 1, the electronic cigarette further comprises a battery structure, and the atomizer is connected to the battery structure.

* * * * *